US011919134B2

(12) United States Patent
Dittrich et al.

(10) Patent No.: US 11,919,134 B2
(45) Date of Patent: Mar. 5, 2024

(54) WORKING TOOL

(71) Applicant: Hilti Aktiengesellschaft, Schaan (LI)

(72) Inventors: Tilo Dittrich, Feldkirch (AT); Norbert Heeb, Buchs (CH); Emanuel Kurth, Chur (CH); Chafic Abu Antoun, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 180 days.

(21) Appl. No.: 17/615,234

(22) PCT Filed: Jun. 22, 2020

(86) PCT No.: PCT/EP2020/067348
§ 371 (c)(1),
(2) Date: Nov. 30, 2021

(87) PCT Pub. No.: WO2021/001196
PCT Pub. Date: Jan. 7, 2021

(65) Prior Publication Data

US 2022/0258317 A1 Aug. 18, 2022

(30) Foreign Application Priority Data

Jul. 4, 2019 (EP) .................................... 19184363

(51) Int. Cl.
*B25C 1/06* (2006.01)
*H02K 17/06* (2006.01)
*B25C 1/00* (2006.01)

(52) U.S. Cl.
CPC ................ *B25C 1/06* (2013.01); *B25C 1/008* (2013.01)

(58) Field of Classification Search
CPC ............. B25C 1/06; H02K 17/06; H02K 7/14
See application file for complete search history.

(56) References Cited

U.S. PATENT DOCUMENTS 3,141,171 A * 7/1964 Doyle ........................ B25C 1/06 335/255
5,280,673 A * 1/1994 Zieve ........................ B21J 15/24 72/430

(Continued)

FOREIGN PATENT DOCUMENTS

CN 101319669 A 12/2008
CN 103166391 A 6/2013

(Continued)

OTHER PUBLICATIONS

International Searching Authority, International Search Report and Written Opinion in International Application No. PCT/EP2020/067348, dated Sep. 18, 2020.

*Primary Examiner* — Nathaniel C Chukwurah
(74) *Attorney, Agent, or Firm* — Leydig, Voit & Mayer, Ltd.

(57) ABSTRACT

A tool having a working piston that moves along a working axis, a drive, for driving the working piston along the working axis, the drive having an electrical capacitor, a squirrel-cage rotor arranged on the working piston and an excitation coil, wherein current flows through the coil during rapid discharge of the capacitor and generates a magnetic field that accelerates the working piston, the tool having a frame of a soft-magnetic and electrically conducting material surrounding the excitation coil and extending in a circumferential direction with respect to the working axis, the frame having one or more at least partial interruptions, which extend over a significant part of a radial extent of the frame with respect to the working axis.

20 Claims, 10 Drawing Sheets

(56) References Cited

U.S. PATENT DOCUMENTS

| | | | | |
|---|---|---|---|---|
| 6,830,173 | B2 * | 12/2004 | Barber | B25C 1/06 173/217 |
| 10,243,418 | B2 | 3/2019 | Nakamura et al. | |
| 10,707,734 | B2 | 7/2020 | Holenstein et al. | |
| 11,712,792 | B2 * | 8/2023 | Dittrich | H02K 7/145 227/120 |
| 11,770,061 | B2 * | 9/2023 | Mecklenburg | H02K 41/0354 310/10 |
| 2003/0183670 | A1 * | 10/2003 | Barber | B25C 1/06 227/131 |
| 2017/0256996 | A1 | 9/2017 | Nakamura et al. | |
| 2017/0302145 | A1 | 10/2017 | Holenstein et al. | |
| 2019/0326805 | A1 | 10/2019 | Mecklenburg et al. | |
| 2023/0012189 | A1 | 1/2023 | Abu Antoun | |

FOREIGN PATENT DOCUMENTS

| | | | |
|---|---|---|---|
| CN | 104904104 | A | 9/2015 |
| CN | 107154696 | A | 9/2017 |
| CN | 107302294 | A | 10/2017 |
| CN | 114786876 | A | 7/2022 |
| DE | 102004008688 | A1 | 9/2005 |
| JP | 2011-30411 | A | 2/2011 |
| WO | WO 2018/104406 | A1 | 6/2018 |

* cited by examiner

WORKING TOOL

CROSS-REFERENCE TO RELATED APPLICATIONS

This patent application is the U.S. National Stage of International Patent Application No. PCT/EP2020/067348, filed Jun. 22, 2020, which claims the benefit of European Patent Application No. 19184363.0, filed Jul. 4, 2019, which are each incorporated by reference.

The present invention relates to a tool, such as for example a setting tool for driving fastening elements into a substrate.

Such tools often have a working piston, which is intended to move along a working axis. The working piston is driven by a drive, which accelerates the working piston. WO 2018/104406 A1 describes a drive, which has an electrical capacitor, a squirrel-cage rotor arranged on the working piston and an excitation coil, which during rapid discharge of the capacitor is flowed through by current and generates a magnetic field that accelerates the working piston.

Setting tools usually have a holder for a fastening element, from which a fastening element held therein is transferred into the substrate along a setting axis. For this, the working element is driven toward the fastening element along the setting axis by the drive. U.S. Pat. No. 6,830,173 B2 discloses a setting tool with a drive, which has an electrical capacitor and a coil.

The object of the present invention is to provide a setting tool of the aforementioned type with which high efficiency and/or good setting quality are ensured.

The object is achieved in the case of a preferably hand-held tool, having a working piston, which is intended to move along a working axis, a drive, which is provided for driving the working piston along the working axis, wherein the drive has an electrical capacitor, a squirrel-cage rotor arranged on the working piston and an excitation coil, which during rapid discharge of the capacitor is flowed through by current and generates a magnetic field that accelerates the working piston, wherein the tool has a frame of a soft-magnetic and electrically conducting material, which surrounds the excitation coil and extends in a circumferential direction with respect to the working axis, wherein the frame has one or more at least partial interruptions, which extend over a significant part of a radial extent of the frame with respect to the working axis.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

In the context of the invention, a soft-magnetic material should be understood as meaning a material that has a high magnetic saturation flux density, and consequently intensifies the magnetic field passing through the material. In particular, the soft-magnetic material of the frame has a saturation flux density of at least 1.0 T, preferably at least 1.3 T, particularly preferably at least 2 T. In the context of the invention, an electrically conductive material should be understood as meaning a material that has a high specific electrical conductivity, so that a magnetic field passing through the material generates eddy currents in the material. In particular, the electrically conducting material of the frame has a specific electrical conductivity of at least $10^4$ S/m, preferably at least $10^5$ S/m, particularly preferably at least $10^6$ S/m. The soft-magnetic and electrically conducting material of the frame preferably consists of a ferromagnetic material, particularly preferably of a ferromagnetic metal, for example iron, cobalt, nickel, or an alloy with one or more ferromagnetic metals as the main constituent.

In the context of the invention, an interruption should be understood as meaning a region that has a significantly smaller specific electrical conductivity than the electrically conducting material of the frame, so that an electrical current flowing in the frame is suppressed or interrupted. In particular, the interruption has a specific electrical conductivity of at most $10^2$ S/m, preferably at most $10^0$ S/m, particularly preferably at most $10^{-2}$ S/m. Preferably, the interruption comprises a gap, for example an air gap or vacuum gap, or an electrically non-conducting, gaseous, liquid and/or solid material, for example plastic, ceramic, glass or the like. The interruptions are preferably produced by means of "electrochemical machining", sawing, for example with a cut-off disk, milling, electrical discharge machining, water-jet cutting, etching or laser cutting.

The at least one interruption extends over a significant part of the radial extent of the frame with respect to the working axis and preferably also over a significant part of an axial direction with respect to the working axis, so that an electrical current flowing in the frame in a circumferential direction with respect to the working axis is suppressed or interrupted. Preferably, the frame is passed through completely in the radial direction and/or in the axial direction by the at least one interruption. A significant part of a radial or axial extent of the frame should be understood as meaning preferably at least 50%, particularly preferably at least 80%, particularly preferably at least 90% of the radial or axial extent of the frame. A thickness of the interruptions in the direction of interruption is preferably between 0.3 mm and 0.8 mm, particularly preferably between 0.4 mm and 0.5 mm.

One advantageous configuration is characterized in that the tool is formed as a setting tool for driving fastening elements into a substrate, comprising a holder, which is provided for holding a fastening element, wherein the working piston is provided for transferring a fastening element held in the holder into the substrate along the working axis, and wherein the drive is provided for driving the working piston onto the fastening element along the working axis.

One advantageous configuration is characterized in that the frame has at least 4 and/or at most 50 interruptions, preferably at most 36 interruptions, which extend over a significant part of the radial extent of the frame. This ensures sufficient mechanical stability of the frame.

One advantageous configuration is characterized in that the one or more interruptions extend over at least 80% of the radial extent of the frame, preferably over at least 90% of the radial extent of the frame. One advantageous configuration is characterized in that the one or more interruptions extend up to an inner edge of the radial extent of the frame. Another advantageous configuration is characterized in that the one or more interruptions extend up to an outer edge of the radial extent of the frame.

One advantageous configuration is characterized in that the one or more interruptions extend over at least 80% of an axial extent of the frame with respect to the working axis, preferably over at least 90% of the axial extent of the frame. One advantageous configuration is characterized in that the one or more interruptions extend up to an end edge of an axial extent of the frame with respect to the working axis.

One advantageous configuration is characterized in that the one or more interruptions pass completely through the frame.

One advantageous configuration is characterized in that the one or more interruptions are in the form of slits.

One advantageous configuration is characterized in that the one or more interruptions are filled with a gas, in particular air, or a liquid or are evacuated.

One advantageous configuration is characterized in that the one or more interruptions consist of a non-conducting material. A specific electrical resistivity of the interruptions is preferably at least 0.12 μΩm, particularly preferably at least 0.3 μΩm and/or at most 0.9 μΩm.

One advantageous configuration is characterized in that the frame consists of a metal or an alloy. Preferably, the frame consists of a steel, particularly preferably of a steel with an iron content of at least 95% and/or with a silicon content of between 1% and 3%.

One advantageous configuration is characterized in that the one or more interruptions extend in the radial direction. Another advantageous configuration is characterized in that the one or more interruptions extend inclined in relation to the radial direction.

One advantageous configuration is characterized in that the one or more interruptions extend in an axial direction with respect to the working axis. Another advantageous configuration is characterized in that the one or more interruptions extend inclined in relation to an axial direction with respect to the working axis.

One advantageous configuration is characterized in that the frame is formed by multiple layers of the soft-magnetic and electrically conducting material, which are separated from one another by the one or more interruptions. Preferably, the layers of the soft-magnetic and electrically conducting material are stacked one on top of the other in a stacking direction, which is inclined in relation to the working axis. Particularly preferably, the stacking direction is inclined at right angles to the working axis.

One advantageous configuration is characterized in that the layers of the soft-magnetic and electrically conducting material are wound around a winding axis. Preferably, the winding axis is oriented parallel to the working axis. One advantageous configuration is characterized in that the layers of the soft-magnetic and electrically conducting material are substantially planar.

One advantageous configuration is characterized in that the drive comprises a switching circuit, by means of which the rapid discharging is triggered.

The invention is represented in a number of exemplary embodiments in the drawings, in which.

Figure 1:
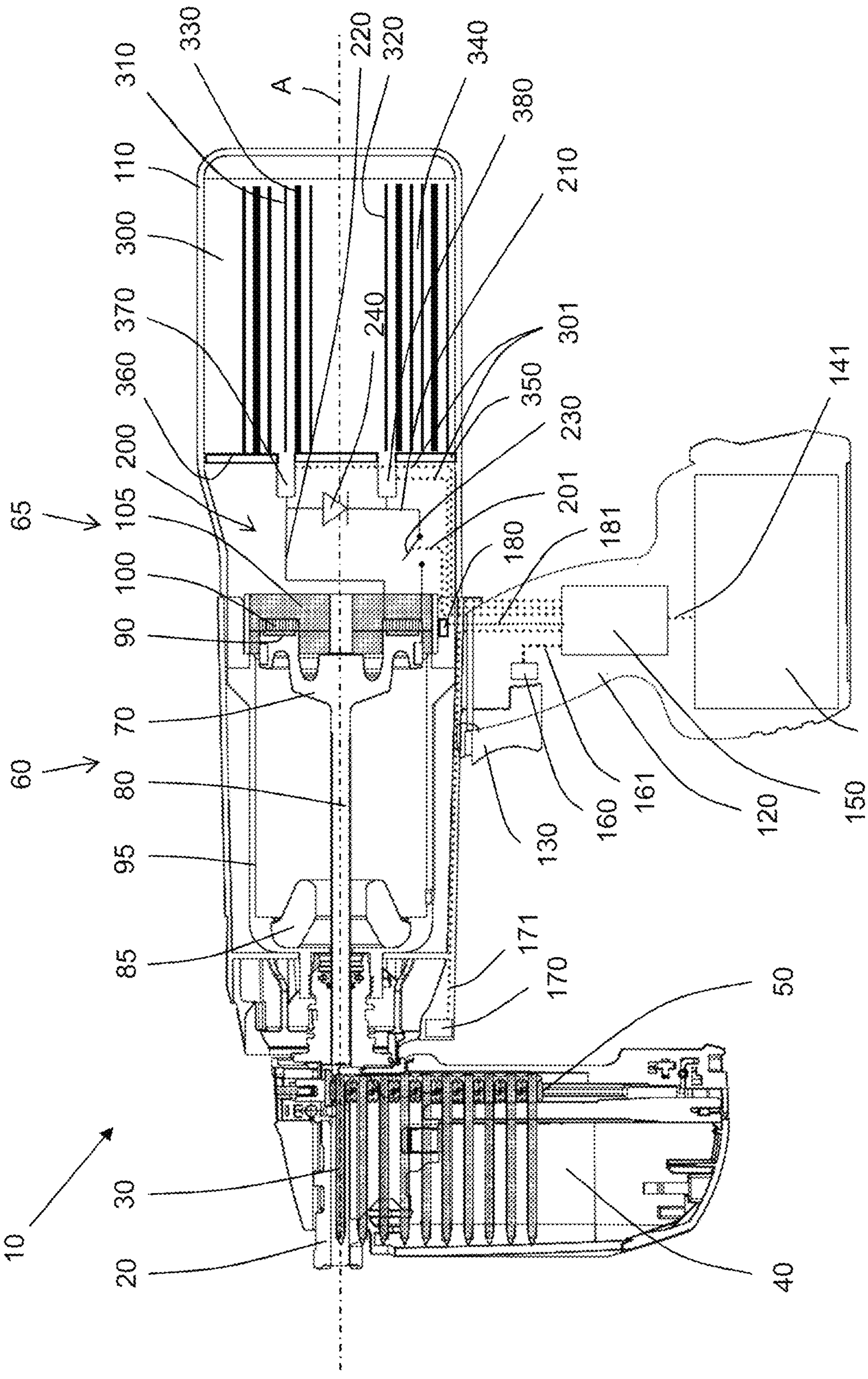
FIG. 1 shows a longitudinal section through a setting tool.

FIG. 1 illustrates a longitudinal section through a hand-held setting tool 10 for driving fastening elements into a substrate that is not shown. The setting tool 10 has a holder 20 formed as a stud guide, in which a fastening element 30, which is formed as a nail, is held in order to be driven into the substrate along a setting axis A (to the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a working piston 60, which comprises a piston plate 70 and a piston rod 80. The working piston 60 is provided for transferring the fastening element 30 out of the holder 20 along the setting axis A into the substrate. In the process, the working piston 60 is guided, by way of its piston plate 70, in a guide cylinder 95 along the setting axis A.

The working piston 60 is, for its part, driven by a drive 65, which comprises a squirrel-cage rotor 90 arranged on the piston plate 70, an excitation coil 100, a soft-magnetic frame 105, a switching circuit 200 and a capacitor 300 with an internal resistance of 5 mohms. The squirrel-cage rotor 90 consists of a preferably ring-like, particularly preferably circular ring-like, element with a low electrical resistance, for example made of copper, and is fastened, for example screwed, riveted, soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a squirrel-cage rotor. The switching circuit 200 is provided for causing rapid electrical discharging of the previously charged capacitor 300 and conducting the thereby flowing discharge current through the excitation coil 100, which is embedded in the frame 105.

In a ready-to-set position of the working piston 60 (FIG. 1), the working piston 60 enters with the piston plate 70 a ring-like recess, not specifically denoted, of the frame 105 such that the squirrel-cage rotor 90 is arranged at a small distance from the excitation coil 100. As a result, an excitation magnetic field, which is generated by a change in an electrical excitation current flowing through the excitation coil, passes through the squirrel-cage rotor 90 and, for its part, induces in the squirrel-cage rotor 90 a secondary electrical current, which circulates in a ring-like manner. This secondary current, which builds up and therefore changes, in turn generates a secondary magnetic field, which opposes the excitation magnetic field, as a result of which the squirrel-cage rotor 90 is subject to a Lorentz force, which is repelled by the excitation coil 100 and drives the working piston 60 toward the holder 20 and also the fastening element 30 held therein.

The setting tool 10 further comprises a housing 110, in which the drive 65 is held, a handle 120 with an operating element 130 formed as a trigger, an electrical energy store 140 formed as a rechargeable battery, a control unit 150, a tripping switch 160, a contact-pressure switch 170, a means for detecting a temperature of the excitation coil 100, formed as a temperature sensor 180 arranged on the frame 105, and electrical connecting lines 141, 161, 171, 181, 201, 301, which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the setting tool 10 is pressed against a substrate that is not shown (to the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electrical current from the electrical energy store 140 into a suitable charge current for the capacitor 300. When the capacitor 300 is charged and the working piston 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 100 and at least one discharge line 210 of which is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive 65, but can be suppressed with the aid of a free-wheeling diode 240. The discharge lines 210, 220 are electrically connected, for example by soldering, welding, screwing, clamping or form-fitting connection, to in each case one electrode 310, 320 of the capacitor 300 by means of electrical contacts 370, 380 of the capacitor 300 which are arranged on an end side 360 of the capacitor 300 that faces the holder 20. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the squirrel-cage rotor 90 and, for its part, induces in the squirrel-cage rotor 90 a secondary electric current, which circulates in a ring-like manner. This secondary current which builds up in turn generates a secondary magnetic field, which opposes the excitation magnetic field, as a result of which the squirrel-cage rotor 90 is subject to a Lorentz force, which is repelled by the excitation coil 100 and drives the working piston 60 toward the holder 20 and also the fastening element 30 held therein. As soon as the piston rod 80 of the working piston 60 meets a head, not specifically denoted, of the fastening element 30, the fastening element 30 is driven into the substrate by the working piston 60. Excess kinetic energy of the working piston 60 is absorbed by a braking element 85 made of a spring-elastic and/or damping material, for example rubber, by way of the working piston 60 moving with the piston plate 70 against the braking element 85 and being braked by the latter until it comes to a standstill. The working piston 60 is then reset to the ready-to-set position by a resetting device that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive 65 can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular by being vapor-deposited, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 μm and 4.8 μm and at a charging voltage of the capacitor 300 of 3000 V a film thickness of for example 9.6 μm. In exemplary embodiments which are not shown, the carrier film is for its part made up of two or more individual films which are arranged as layers one on top of the other. The electrodes 310, 320 have a sheet resistance of 50 ohms/□.

A surface of the capacitor 300 has the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting tool 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with prestress. In further exemplary embodiments which are not shown, the connecting lines have a degree of rigidity which continuously decreases as the distance from the capacitor increases.

Figure 2:
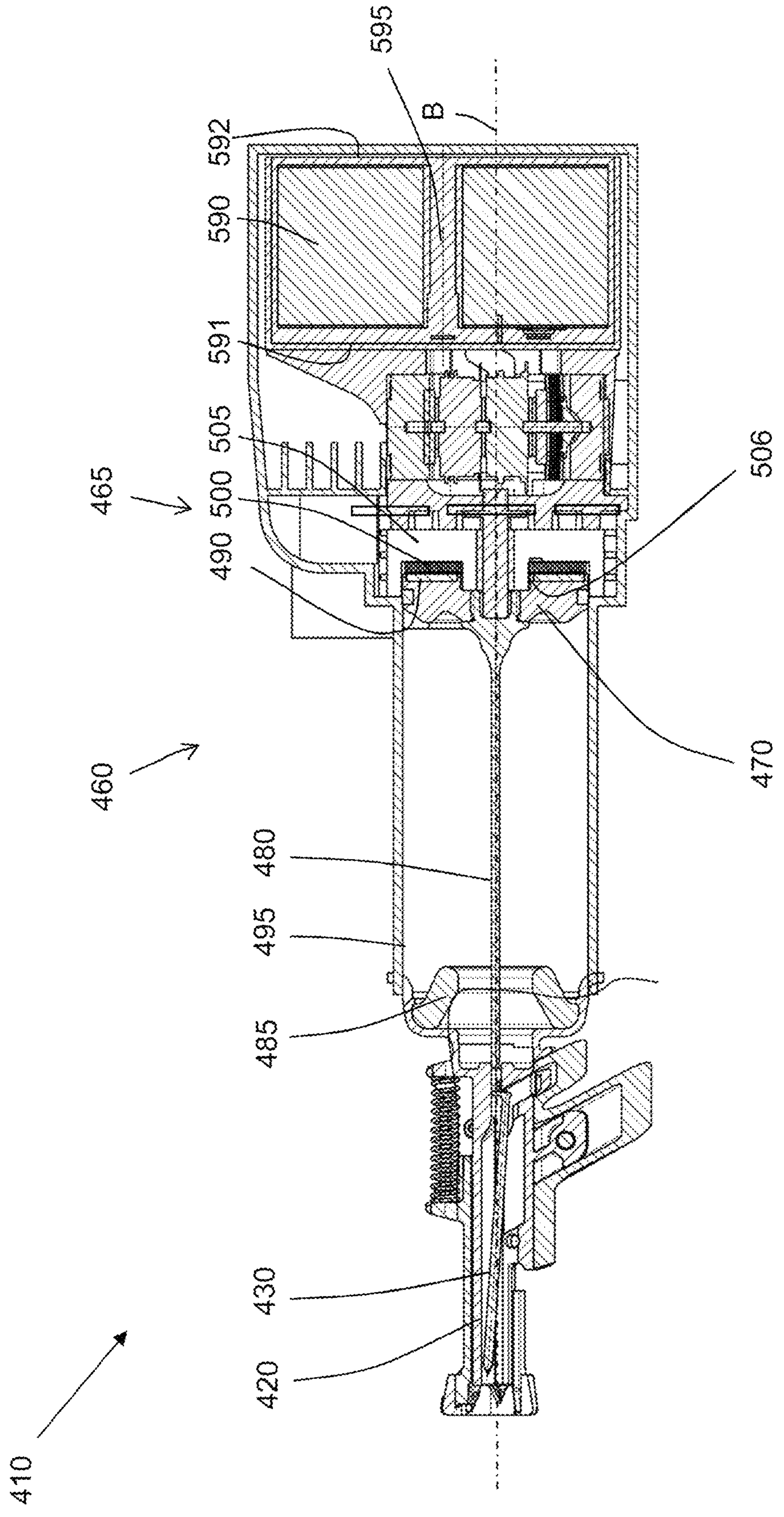
FIG. 2 shows a longitudinal section through a drive of a setting tool.

FIG. 2 partially illustrates a schematic longitudinal section through a setting tool 410 for driving fastening elements into a substrate that is not shown. The setting tool 410 has a holder 420 formed as a stud guide, in which a fastening element 430, which is formed as a nail, is held in order to be driven into the substrate along a setting axis B (to the left in FIG. 2). The setting tool 410 comprises a working piston 460 with a piston plate 470 and a piston rod 480, which is guided along the setting axis B in a guide cylinder 495. The working piston 460 is driven by a drive 465, which comprises a squirrel-cage rotor 490 arranged on the piston plate 470, an excitation coil 500, a soft-magnetic frame 505, a switching circuit not denoted any more specifically and a capacitor 590. The squirrel-cage rotor 490 is fastened on the piston plate 470 on the side of the piston plate 470 that faces away from the holder 420.

The capacitor 590 is arranged behind the drive-in element 460 on the setting axis B, whereas the holder 420 is arranged in front of the drive-in element 460. With respect to the setting axis B, the capacitor 590 is arranged in an axially and radially offset, but radially overlapping, manner in relation to the drive-in element 460. The capacitor 590 is mounted in a damped manner on the rest of the setting tool 410 by means of a damping element 595, wherein the damping element 595 extends from an end face 591 of the capacitor 590 that faces the holder 420 up to an end face 592 of the capacitor 590 that faces away from the holder 420.

In a ready-to-set position of the working piston 460 (FIG. 2), the working piston 460 enters with the piston plate 470 a ring-like recess 506 of the frame 505 such that the squirrel-cage rotor 490 is arranged at a small distance from the excitation coil 500. In exemplary embodiments which are not shown, the squirrel-cage rotor is arranged at a small distance from the excitation coil, without entering a recess of the frame. At the end of the setting process, under some circumstances the working piston 460 comes up against a braking element 485 in particular with its piston plate 470 and after that, in particular directly after that, is returned to the ready-to-set position by a resetting device not denoted any more specifically.

Figure 3:
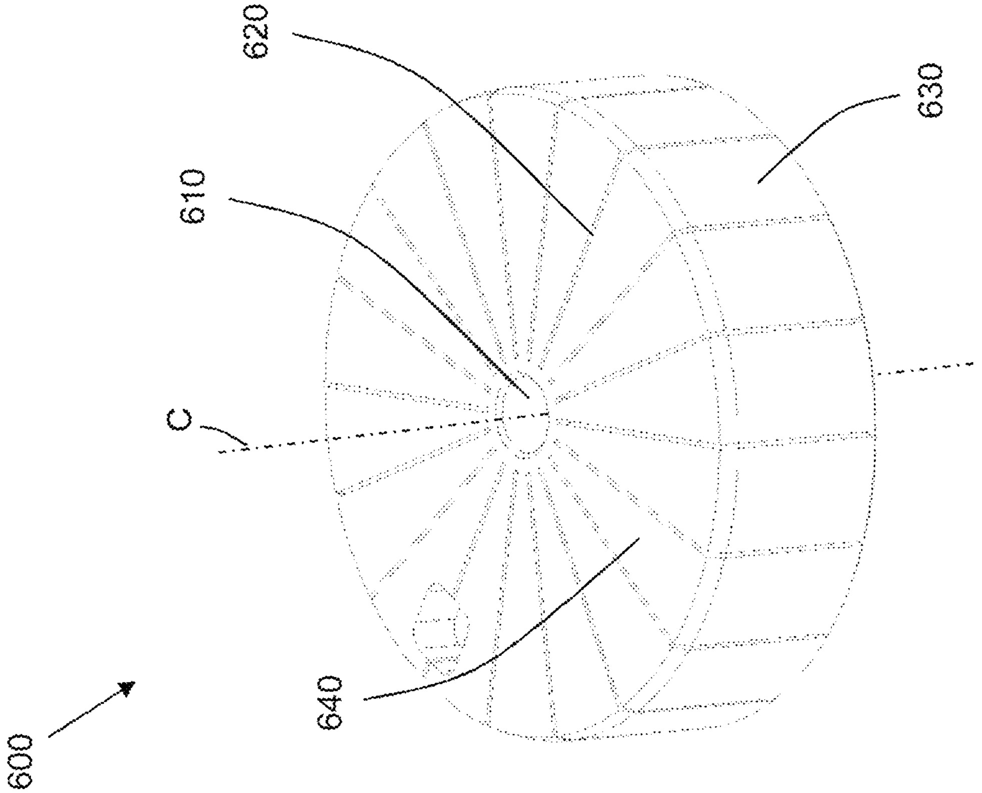
FIG. 3 shows a perspective view of a frame.

FIG. 3 illustrates a perspective view of a frame 600, which can be inserted into a tool, for example into the setting tool 10 shown in FIG. 1 or the setting tool 410 shown in FIG. 2. The frame 600 consists of a metal, for example iron, or an alloy, for example a steel with a saturation density of 1.6 T and a specific electrical conductivity of $8\times10^6$ S/m, and has a substantially cylindrical, in particular circular-cylindrical, outer contour and extends in a circumferential direction with respect to a working axis C of the tool. In particular, a cylinder axis of the outer contour coincides with the working axis C. The frame 600 consists of a soft-magnetic and electrically conducting material and has a central breakthrough 610 with respect to the working axis C that passes completely through the frame 600 in an axial direction with respect to the working axis C.

Furthermore, the frame 600 has eighteen interruptions 620, which extend over 94% of a radial extent of the frame 600 with respect to the working axis C and pass completely through the frame 600 in the axial direction. The interruptions 620 are in the form of slits, in particular are formed as air slits, and extend up to an outer edge 630 of the radial extent of the frame 600, so that the frame 600 is slit from the outside. In embodiments which are not shown, the interruptions are filled with another gas or liquid, or are evacuated. In further exemplary embodiments which are not shown, the interruptions consist of a non-conducting material, for example a potting compound of plastic, rubber, adhesive or the like. The interruptions 620 extend in the axial direction up to a front end edge of the frame 600 that is concealed in FIG. 3 and up to a rear end edge 640 of the frame 600, so that the frame 600 is axially passed through completely by the interruptions 620. The interruptions 620 extend in the radial direction and in the axial direction and are not inclined in relation to the radial direction or the axial direction.

The interruptions 620 have the effect of suppressing eddy currents in the frame 600, so that undesired magnetic fields that can be generated by eddy currents are reduced and the efficiency of the drive and of the tool is increased.

Figure 4:
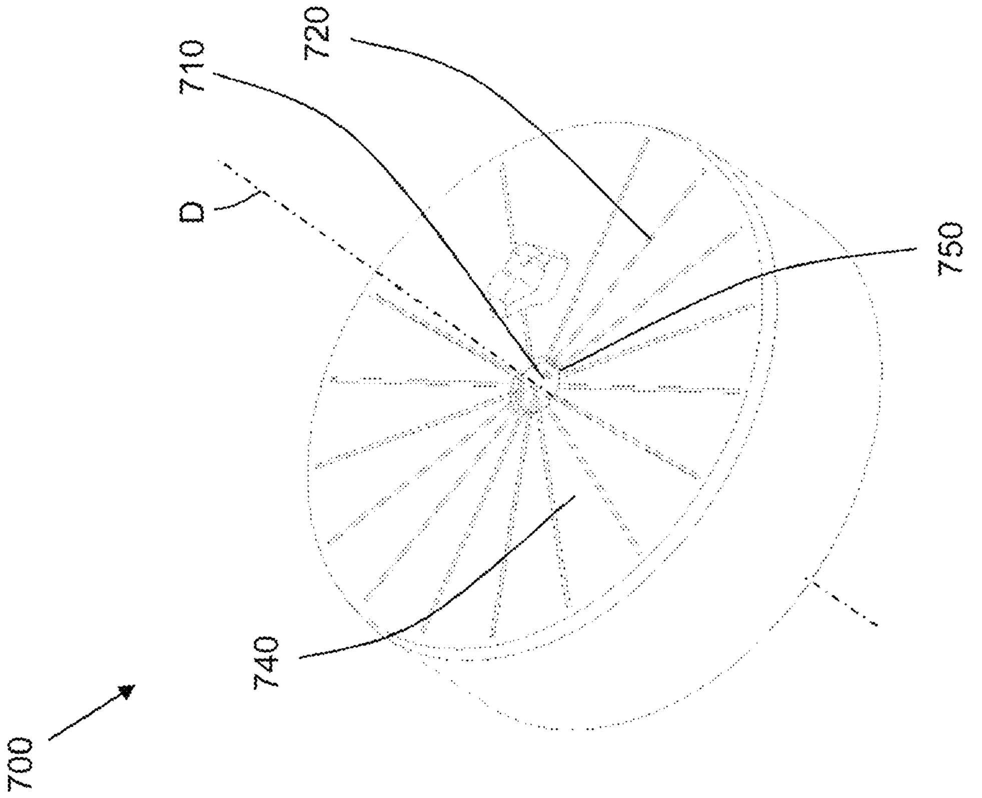
FIG. 4 shows a perspective view of a frame.

FIG. 4 illustrates a perspective view of a frame 700, which can be inserted into a tool, for example into the setting tool 10 shown in FIG. 1 or the setting tool 410 shown in FIG. 2. The frame 700 has a substantially cylindrical, in particular circular-cylindrical, outer contour and extends in a circumferential direction with respect to a working axis D of the tool. In particular, a cylinder axis of the outer contour coincides with the working axis D. The frame 700 consists of a soft-magnetic and electrically conducting material and has a central breakthrough 710 with respect to the working axis D that passes completely through the frame 700 in an axial direction with respect to the working axis D.

Furthermore, the frame 700 has sixteen interruptions 720, which extend over 96% of a radial extent of the frame 700 with respect to the working axis D and pass completely through the frame 700 in the axial direction. The interruptions 720 are in the form of slits and extend up to an inner edge 750 of the radial extent of the frame 700, so that the frame 700 is slit from the inside. The interruptions 720 extend in the axial direction up to a front end edge of the frame 700 that is concealed in FIG. 4 and up to a rear end edge 740 of the frame 700, so that the frame 700 is axially passed through completely by the interruptions 720. The interruptions 720 extend in the radial direction and in the axial direction and are not inclined in relation to the radial direction or the axial direction.

Figure 5:
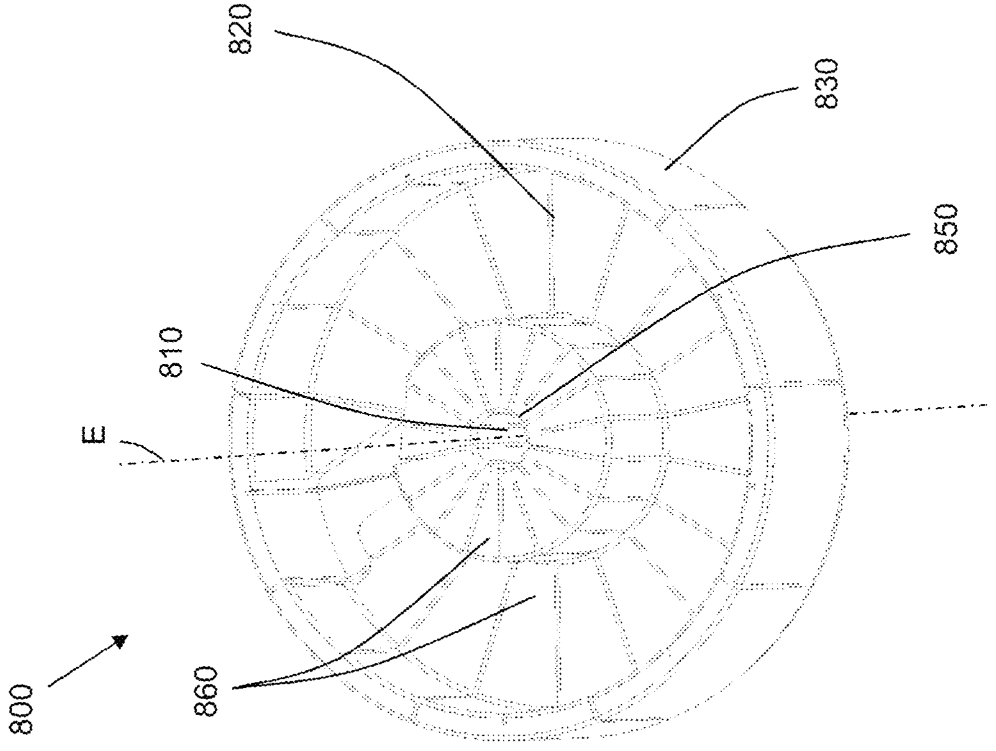
FIG. 5 shows a perspective view of a frame.

FIG. 5 illustrates a perspective view of a frame 800, which can be inserted into a tool, for example into the setting tool 10 shown in FIG. 1 or the setting tool 410 shown in FIG. 2. The frame 800 has a substantially cylindrical, in particular circular-cylindrical, outer contour and extends in a circumferential direction with respect to a working axis E of the tool. In particular, a cylinder axis of the outer contour coincides with the working axis E. The frame 800 consists of a soft-magnetic and electrically conducting material and has a central breakthrough 810 with respect to the working axis E that passes completely through the frame 800 in an axial direction with respect to the working axis E.

Furthermore, the frame 800 has eighteen interruptions 820, which extend over 95% of a radial extent of the frame 800 with respect to the working axis E and pass completely through the frame 800 in the axial direction. The interruptions 820 are in the form of slits and extend alternately up to an outer edge 830 and up to an inner edge 850 of the radial extent of the frame 800, so that the frame 800 is slit alternately from the the outside and from the inside. The interruptions 820 extend in the axial direction up to a front end edge 860 of the frame 800 and up to a rear end edge of the frame 800 that is concealed in FIG. 5, so that the frame 800 is axially passed through completely by the interruptions 820. The interruptions 820 extend in the radial direction and in the axial direction and are not inclined in relation to the radial direction or the axial direction.

Figure 6:
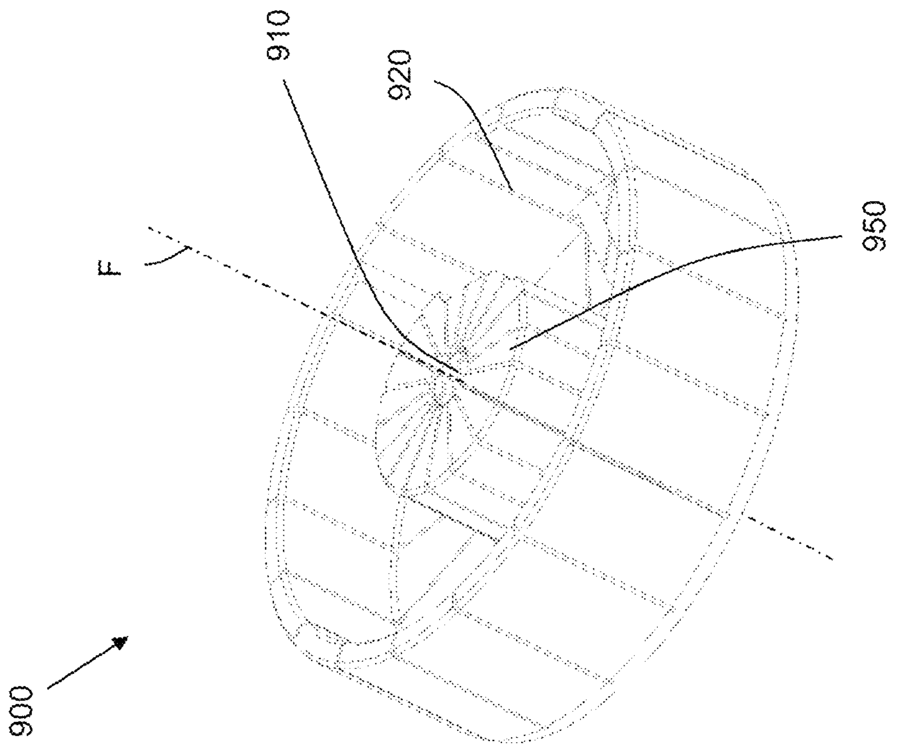
FIG. 6 shows a perspective view of a frame.

FIG. 6 illustrates a perspective view of a frame 900, which can be inserted into a tool, for example into the setting tool 10 shown in FIG. 1 or the setting tool 410 shown in FIG. 2. The frame 900 has a substantially cylindrical, in particular circular-cylindrical, outer contour and extends in a circumferential direction with respect to a working axis F of the tool. In particular, a cylinder axis of the outer contour coincides with the working axis F. The frame 900 consists of a soft-magnetic and electrically conducting material and has a central breakthrough 910 with respect to the working axis F that passes completely through the frame 900 in an axial direction with respect to the working axis F.

Furthermore, the frame 900 has eighteen interruptions 920, which pass completely through the frame 900 in a radial direction with respect to the working axis F and extend over 94% of an extent of the frame 900 in the axial direction. The interruptions 920 are in the form of slits and extend in the axial direction up to a front end edge 950 of the radial extent of the frame 900, so that the frame 900 is slit from the front. The interruptions 920 extend in the radial direction and in the axial direction and are not inclined in relation to the radial direction or the axial direction.

Figure 7:
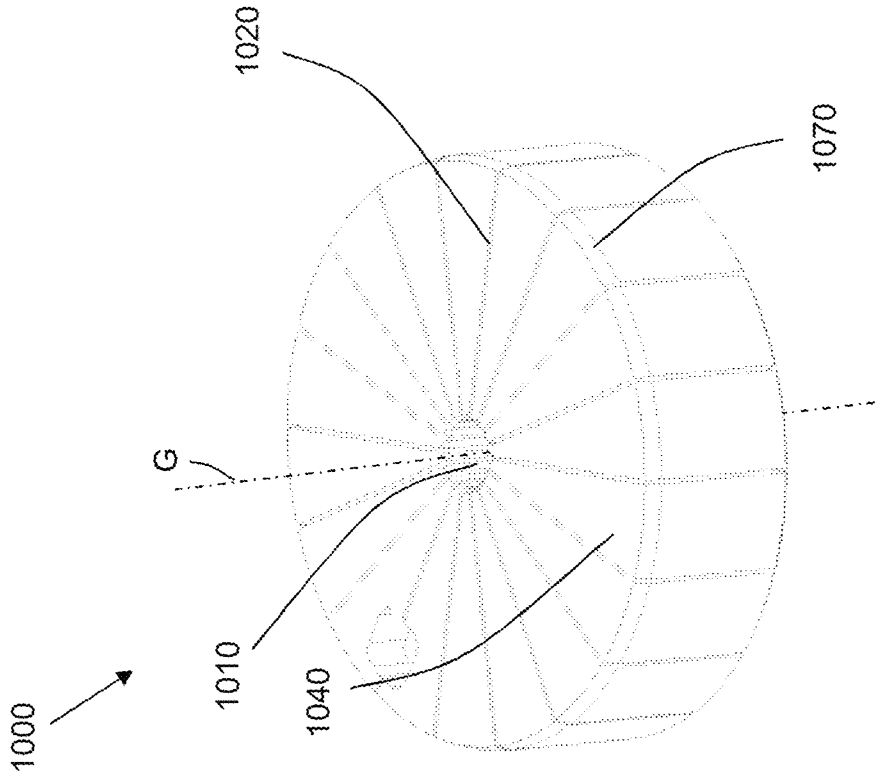
FIG. 7 shows a perspective view of a frame.

FIG. 7 illustrates a perspective view of a frame 1000, which can be inserted into a tool, for example into the setting tool 10 shown in FIG. 1 or the setting tool 410 shown in FIG. 2. The frame 1000 has a substantially cylindrical, in particular circular-cylindrical, outer contour and extends in a circumferential direction with respect to a working axis G of the tool. In particular, a cylinder axis of the outer contour coincides with the working axis G. The frame 1000 consists of a soft-magnetic and electrically conducting material and has a central breakthrough 1010 with respect to the working axis G that passes completely through the frame 1000 in an axial direction with respect to the working axis G.

Furthermore, the frame 1000 has eighteen interruptions 1020, which pass completely through the frame 1000, that is to say in a radial direction with respect to the working axis G and in the axial direction, thus from a front end edge of the frame 1000 that is concealed in FIG. 7 up to a rear end edge 1040 of the frame 700. Consequently, the frame 1000 is made up of eighteen individual segments 1070, which extend in the circumferential direction respectively over an angle of 20°. The interruptions 1020 extend in the radial direction and in the axial direction and are not inclined in relation to the radial direction or the axial direction.

Figure 8:
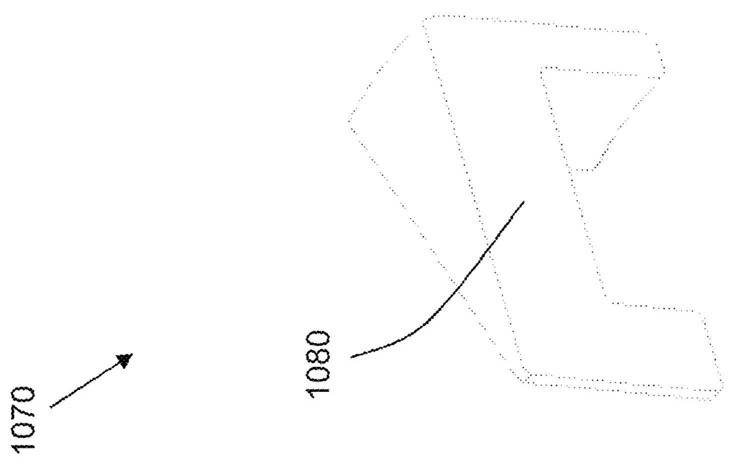
FIG. 8 shows a perspective view of a segment of a frame.

FIG. 8 illustrates a perspective view of such a segment 1070. The segment 1070 is provided, for example coated, on its surface with an electrically non-conducting layer 1080, in order to suppress undesired eddy currents over a number of segments.

Figure 9:
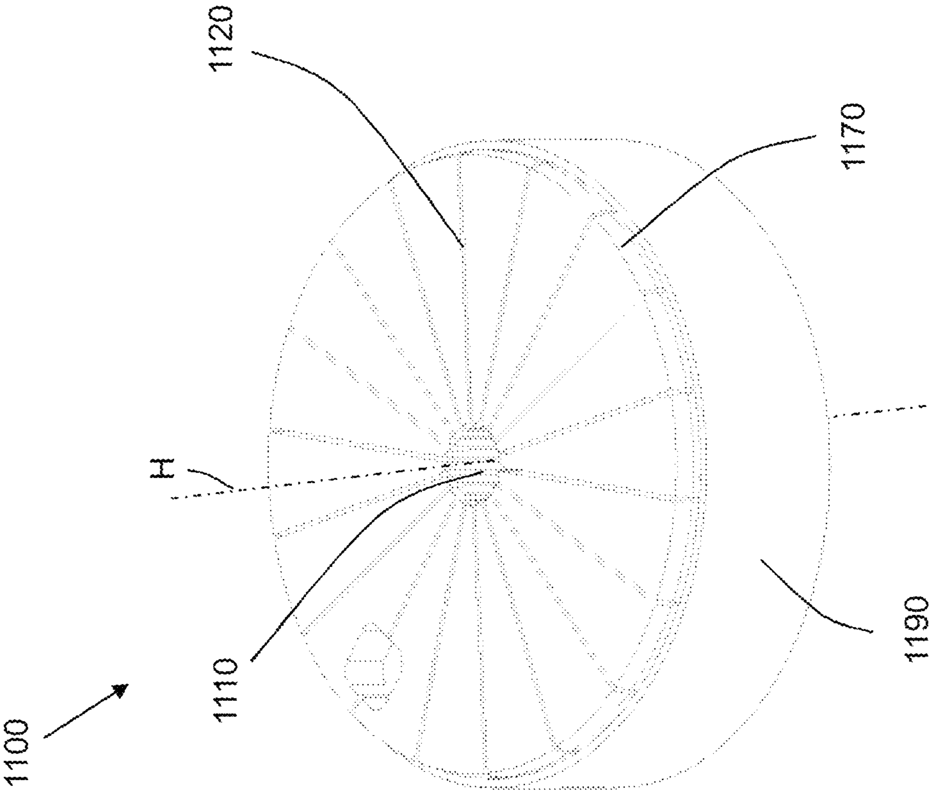
FIG. 9 shows a perspective view of a frame.

FIG. 9 illustrates a perspective view of a frame 1100, which can be inserted into a tool, for example into the setting tool 10 shown in FIG. 1 or the setting tool 410 shown in FIG. 2. The frame 1100 has a substantially cylindrical, in particular circular-cylindrical, outer contour and extends in a circumferential direction with respect to a working axis H of the tool. In particular, a cylinder axis of the outer contour coincides with the working axis H. The frame 1100 consists of a soft-magnetic and electrically conducting material and has a central breakthrough 1110 with respect to the working axis H that passes completely through the frame 1100 in an axial direction with respect to the working axis H.

Furthermore, the frame 1100 has eighteen interruptions 1020, which pass completely through the frame 1100, that is to say in a radial direction with respect to the working axis H and in the axial direction. Consequently, the frame 1100 is made up of eighteen individual segments 1170, which extend in the circumferential direction respectively over an angle of 20°. The interruptions 1120 extend in the radial direction and in the axial direction and are not inclined in relation to the radial direction or the axial direction. The frame 1100 is provided with a supporting element 1190, which is formed in particular in a ring shape and encloses the segments 1170 at a radially outer edge. The supporting element 1190 supports the segments 1170 against radially outwardly acting forces which occur in particular during operation, for example on account of magnetic fields. The supporting element 1190 preferably consists of an electrically non-conducting material, for example fiber-reinforced plastic, so that undesired eddy currents within the supporting element 1190 are avoided.

Figure 11:
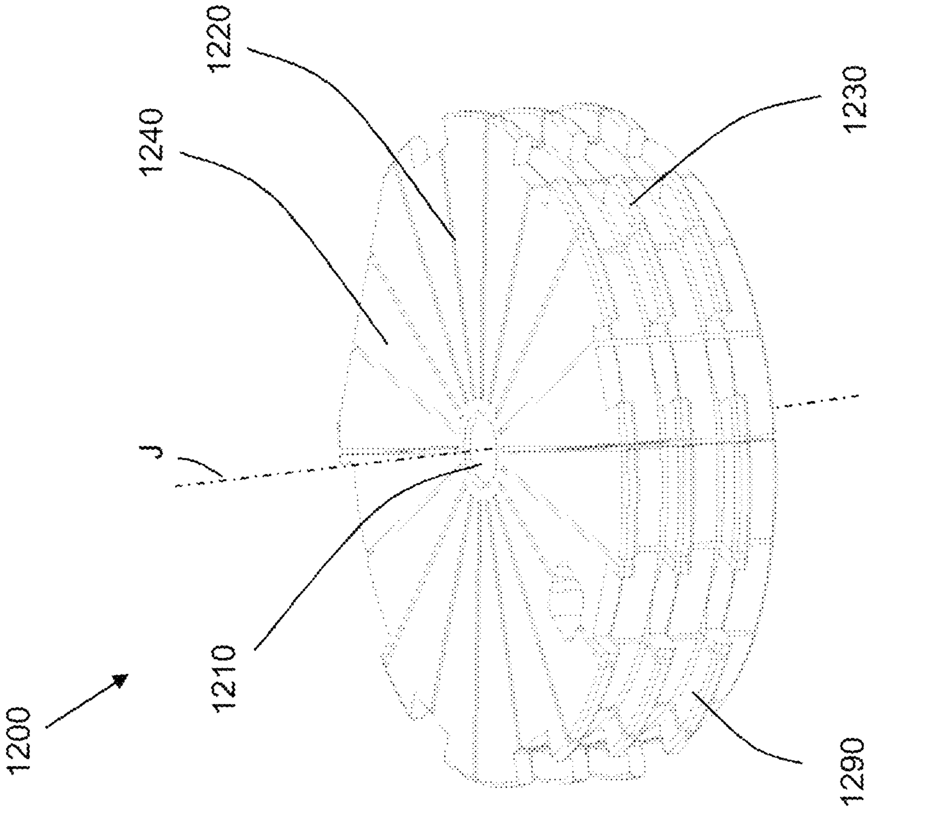
FIG. 11 shows a perspective view of a frame.
Figure 10:
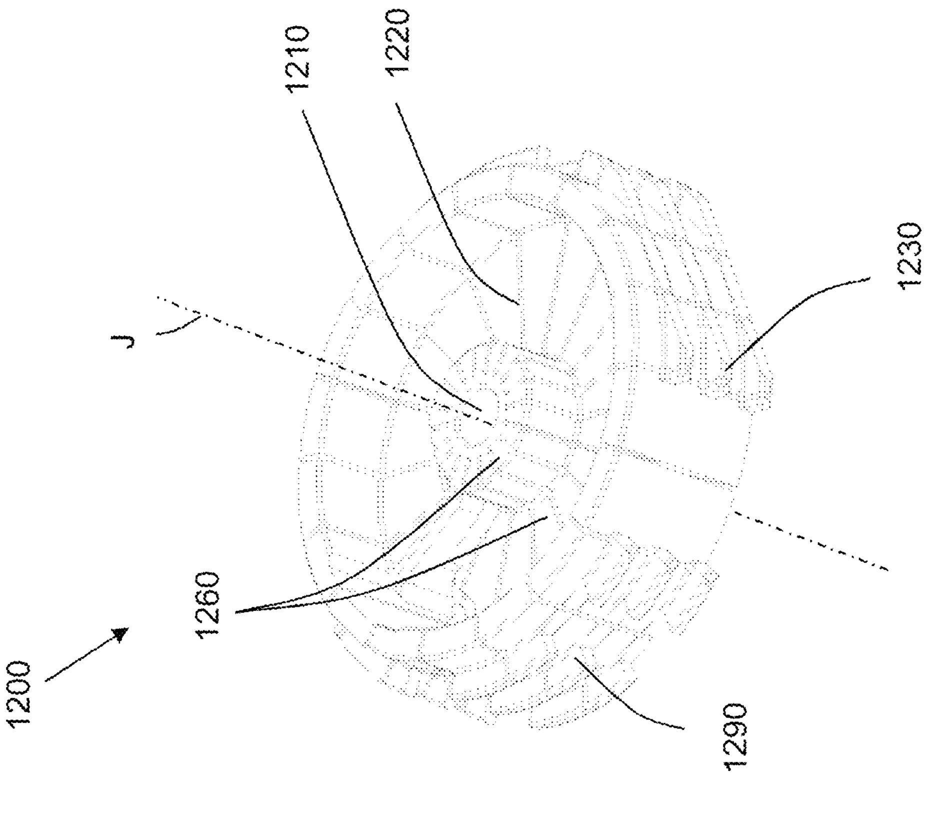
FIG. 10 shows a perspective view of a frame.

FIG. 10 and FIG. 11 illustrate a perspective view of a frame 1200, which can be inserted into a tool, for example into the setting tool 10 shown in FIG. 1 or the setting tool 410 shown in FIG. 2. The frame 1200 has a substantially cylindrical, in particular circular-cylindrical, outer contour and extends in a circumferential direction with respect to a working axis J of the tool. In particular, a cylinder axis of the outer contour coincides with the working axis J. The frame 1200 consists of a soft-magnetic and electrically conducting material and has a central breakthrough 1210 with respect to the working axis J that passes completely through the frame 1200 in an axial direction with respect to the working axis J.

Furthermore, the frame 1200 has eighteen interruptions 1220, which are in the form of slits, in particular are formed as air slits, and extend up to an outer edge 1230 of the radial extent of the frame 1200, so that the frame 1200 is slit from the outside. The interruptions 1220 extend in the axial direction up to a front end edge 1260 of the frame 1200 and up to a rear end edge 1240 of the frame 1200, so that the frame 1200 is axially passed through completely by the interruptions 1220. The interruptions 1220 extend in the radial direction and in the axial direction and are not inclined in relation to the radial direction or the axial direction. Furthermore, the frame 1200 has cooling elements 1290, which are arranged at the outer edge 1230. The cooling elements are formed as cooling ribs and bring about an increase in size of a surface of the frame 1200, and consequently assist a heat transfer between the frame 1200 and its surroundings. In embodiments which are not shown, the cooling elements are alternatively or additionally arranged at the front end edge and/or at the rear end edge. In further exemplary embodiments which are not shown, the cooling elements are formed as pins or nubs or as recesses.

Figure 12:
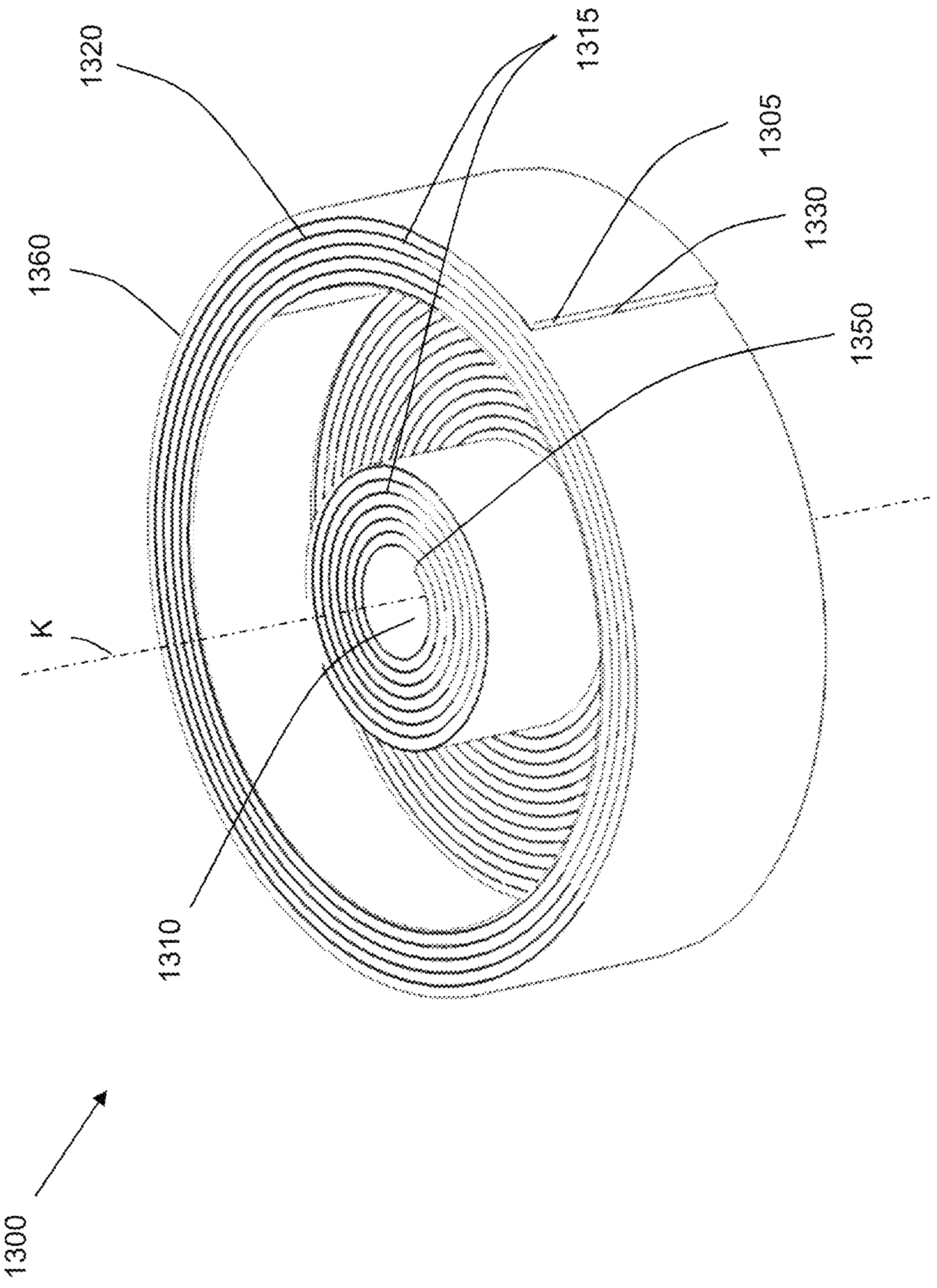
FIG. 12 shows a perspective view of a frame.

FIG. 12 illustrates a perspective view of a frame 1300, which can be inserted into a tool, for example into the setting tool 10 shown in FIG. 1 or the setting tool 410 shown in FIG. 2. The frame 1300 has a substantially cylindrical, in particular circular-cylindrical, outer contour and extends in a circumferential direction with respect to a working axis K of the tool. In particular, a cylinder axis of the outer contour coincides with the working axis K. The frame 1300 has a central breakthrough 1310 with respect to the working axis K that passes completely through the frame 1300 in an axial direction with respect to the working axis K.

The frame 1300 is formed from a flexible metal sheet 1305 of a soft-magnetic and electrically conducting material, which is wound around a winding axis. The winding axis is in this case oriented parallel to the working axis K and coincides in particular with the working axis K. As a result of the winding, the sheet 1305 forms a multiplicity of layers 1315, which are separated from one another by a multiplicity of intermediate layers and are stacked one on top of the other in a stacking direction, wherein the stacking direction is inclined, in particular at right angles, in relation to the working axis K and extends overall approximately in a radial direction with respect to the winding axis. On account of the stacking, in particular in the stacking direction mentioned, the layers 1315 support an excitation coil that is not shown and is embedded in the frame 1300 against radially outwardly acting forces, which occur in particular during operation, for example on account of magnetic fields.

In the context of the invention, the intermediate layers form a single interruption 1320, which extends spirally from the inside outward with respect to the working axis K. The interruption 1320 extends up to an outer edge 1330 of the frame 1300 and up to an inner edge 1350 of the frame, so that the frame 1300 is radially passed through completely by the interruption 1320. The intermediate layers extend in the axial direction up to a front end edge 1360 of the frame 1300 and up to a rear end edge of the frame 1300 that cannot be seen in FIG. 12, so that the frame 1300 is axially passed through completely by the interruption 1320. On account of its spiral form, the interruption 1320 is inclined in relation to the radial direction and extends in the axial direction and is not inclined in relation to the axial direction.

Figure 13:
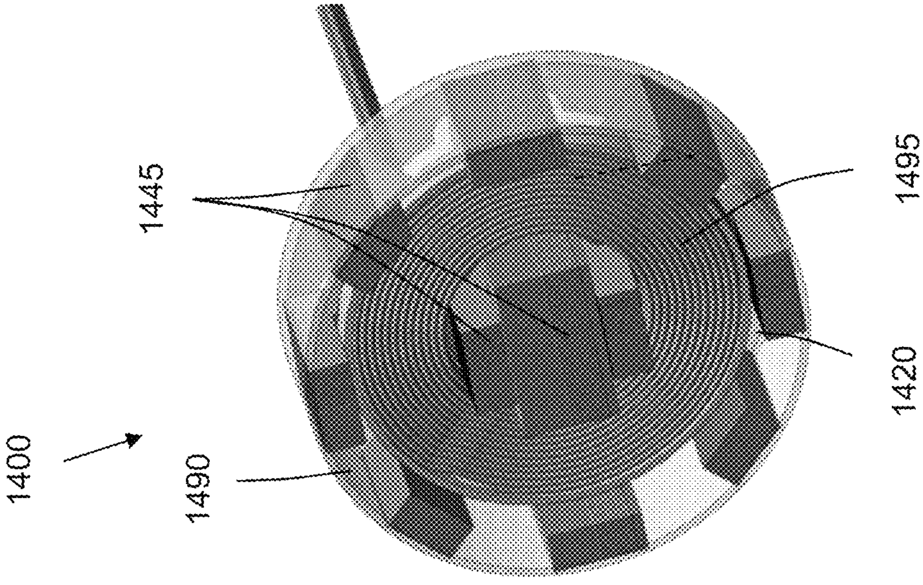
FIG. 13 shows a perspective view of a frame.
Figure 14:
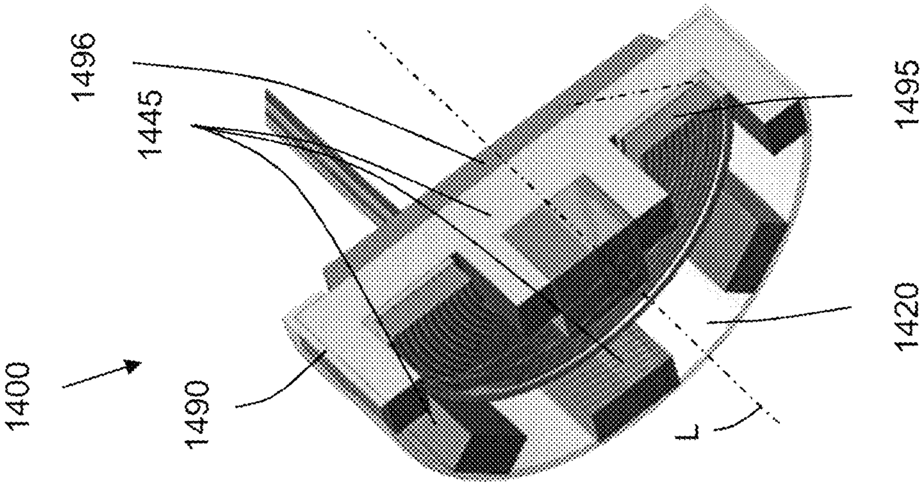
FIG. 14 shows a perspective longitudinal section through a frame.
Figure 15:
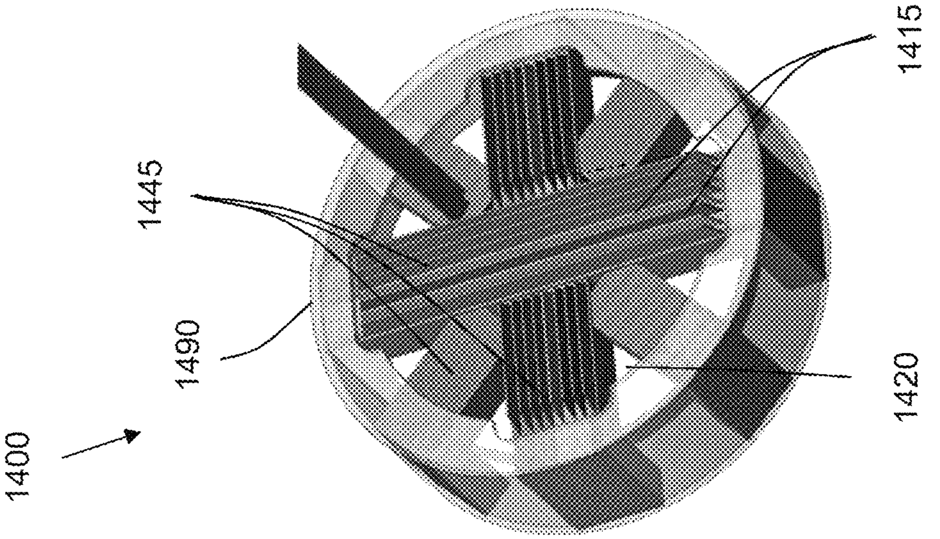
FIG. 15 shows a perspective view of a frame.

FIG. 13, FIG. 14 and FIG. 15 illustrate a perspective view of a frame 1400 and a perspective longitudinal section (FIG. 14) through a frame 1400, which can be inserted into a tool, for example into the setting tool 10 shown in FIG. 1 or the setting tool 410 shown in FIG. 2. The frame 1400 has a substantially cylindrical, in particular circular-cylindrical, outer contour and extends in a circumferential direction with respect to a working axis L of the tool. In particular, a cylinder axis of the outer contour coincides with the working axis L.

The frame 1400 comprises a number of sub-blocks 1445, which are respectively formed by a number of planar layers 1415 of a soft-magnetic and electrically conducting material and are arranged in particular in a star shape around the working axis L. The layers 1415 are for example formed by metal sheets. The layers 1415 are separated from one another by a number of intermediate layers and are stacked one on top of the other in a stacking direction, which is inclined, in particular at right angles, in relation to the working axis L and is the same in the respective sub-block 1445, but differs from sub-block to sub-block. The intermediate layers and intermediate spaces between the sub-blocks 1445 form interruptions 1420, which pass through the respective sub-block 1445 completely, that is to say pass through completely in a direction perpendicular to the working axis L and in the axial direction. The interruptions 1420 extend in the direction perpendicular to the working axis L and in the axial direction and are not inclined in relation to the axial direction. The layers 1415 are preferably coated with an electrically non-conducting material, so that the interruptions 1420 consist of this material.

The excitation coil 1495 is embedded in the frame 1400, and in particular is arranged in a recess of the frame 1400 not denoted any more specifically. The frame 1400 is provided with a supporting element 1490, which is formed in particular in a ring shape and encloses the sub-blocks 1445 at a radially outer edge. The supporting element 1490 supports the sub-blocks 1445 against radially outwardly acting forces, which occur in particular during operation, for example on account of magnetic fields. The supporting element 1490 preferably consists of an electrically non-conducting material, for example fiber-reinforced plastic, so that undesired eddy currents within the supporting element 1490 are avoided. For example, the supporting element 1490 consists of an injection-molded part, in which the sub-blocks 1445, and in particular also the excitation coil 1495, are molded. A second supporting element 1496 supports the frame 1400 in the axial direction and preferably consists of an electrically non-conducting material and/or is preferably likewise provided with interruptions.

Figure 16:
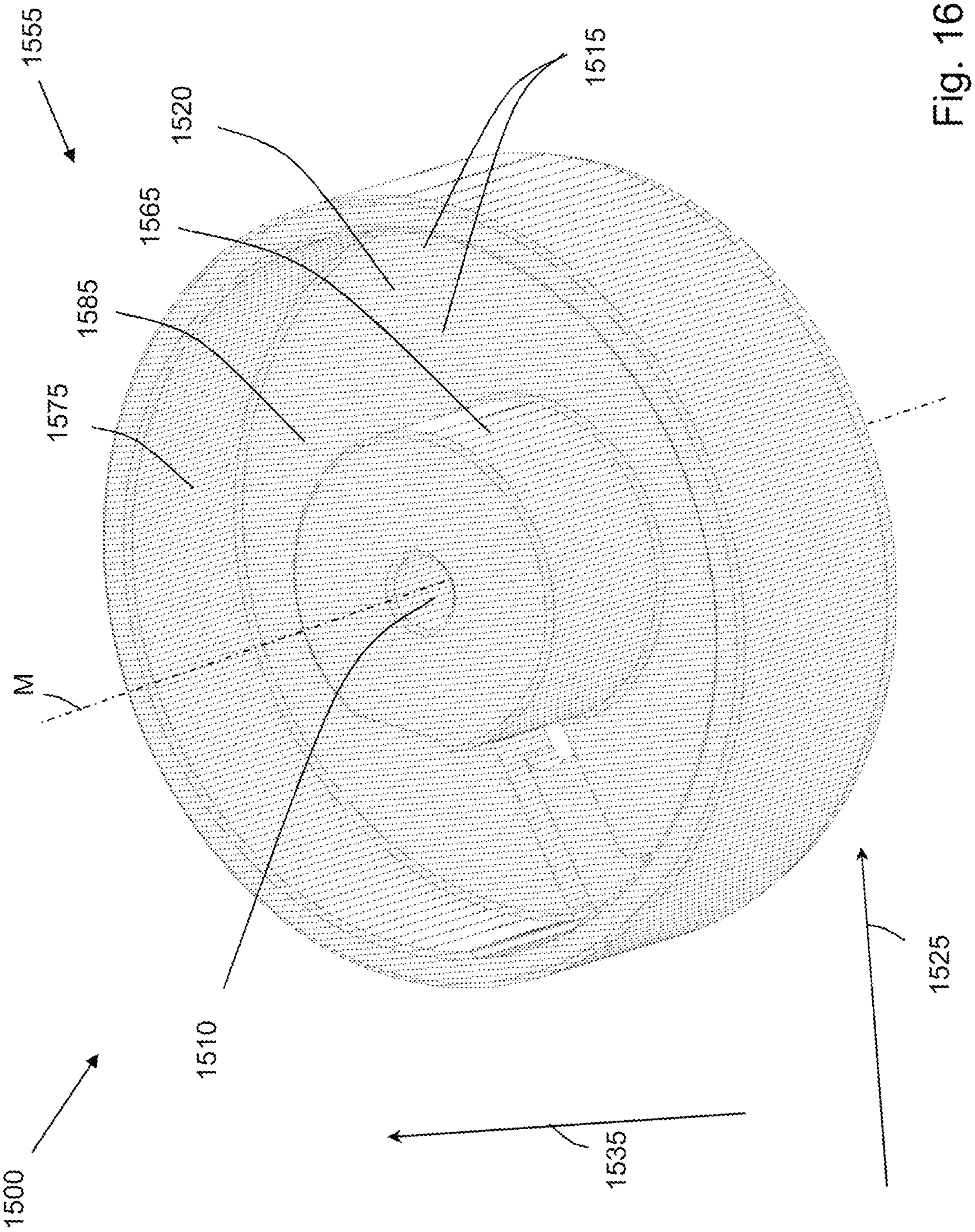
FIG. 16 shows a perspective view of a frame.

FIG. 16 illustrates a perspective view of a frame 1500, which can be inserted into a tool, for example into the setting tool 10 shown in FIG. 1 or the setting tool 410 shown in FIG. 2. The frame 1500 has a substantially cylindrical, in particular circular-cylindrical, outer contour and extends in a circumferential direction with respect to a working axis M of the tool. In particular, a cylinder axis of the outer contour coincides with the working axis M. The frame 1500 has a central breakthrough 1510 with respect to the working axis M that passes completely through the frame 1500 in an axial direction with respect to the working axis M. Furthermore, the frame 1500 has a ring-shaped recess 1555, which is entered by a working piston and/or a squirrel-cage rotor. The recess 1555 has an inner wall 1565, an outer wall 1575 and a bottom 1585, wherein an excitation coil that is not shown is arranged on the bottom 1585, so that the squirrel-cage rotor, if provided, is arranged at a small distance from the excitation coil.

The frame 1500 is formed by a number of planar layers 1515 of a soft-magnetic and electrically conducting material, which are separated from one another by a multiplicity of intermediate layers. The layers 1515 are for example formed by metal sheets. The layers 1515 are stacked one on top of the other in a stacking direction 1525, which is inclined, in particular at right angles, in relation to the working axis M and is the same in the entire frame 1500. The intermediate layers form interruptions 1520, which pass through the frame 1500 completely, that is to say pass through completely in a direction 1535 perpendicular to the working axis M and in the axial direction. The interruptions 1520 extend in the direction 1535 perpendicular to the working axis M and in the axial direction and are not inclined in relation to the axial direction. The fact that the layers 1515 are of a planar form and are mostly offset parallel with respect to the cylinder axis means that the interruptions 1520 are in certain regions inclined in relation to the radial direction. The layers 1515 are preferably coated with an electrically non-conducting material, so that the interruptions 1520 consist of this material.

In exemplary embodiments which are not shown, some of the layers protrude axially and/or radially with respect to other layers to form cooling elements. Cooling of the frame improves a constancy of the energy transferred to the squirrel-cage rotor under some circumstances.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A tool having a working piston that moves along a working axis; a drive, for driving the working piston along the working axis, wherein the drive has an electrical capacitor; a squirrel-cage rotor arranged on the working piston; and an excitation coil, wherein current flows through the excitation coil during rapid discharge of the capacitor and generates a magnetic field that accelerates the working piston, wherein the tool has a frame of a soft-magnetic and electrically conducting material, which surrounds the excitation coil and extends in a circumferential direction with respect to the working axis, wherein the frame has one or more at least partial interruptions, which extend over a significant part of a radial extent of the frame with respect to the working axis.

2. The tool as claimed in claim 1, formed as a setting tool for driving fastening elements into a substrate, comprising a holder for holding a fastening element, wherein the working piston transfers a fastening element held in the holder into the substrate along the working axis, and wherein the drive drives the working piston onto the fastening element along the working axis.

3. The tool as claimed in claim 1, wherein the one or more at least partial interruptions extend up to an inner edge of the radial extent of the frame.

4. The tool as claimed in claim 1, wherein the one or more at least partial interruptions extend up to an outer edge of the radial extent of the frame.

5. The tool as claimed in claim 1, wherein the one or more at least partial interruptions extend up to an end edge of an axial extent of the frame with respect to the working axis.

6. The tool as claimed in claim 1, wherein the one or more at least partial interruptions pass completely through the frame.

7. The tool as claimed in claim 1, wherein the one or more at least partial interruptions are in the form of slits.

8. The tool as claimed in claim 1, wherein the one or more at least partial interruptions extend in the radial direction.

9. The tool as claimed in claim 1, wherein the one or more at least partial interruptions extend inclined in relation to the radial direction.

10. The tool as claimed in claim 1, wherein the one or more at least partial interruptions extend in an axial direction with respect to the working axis.

11. The tool as claimed in claim 1, wherein the one or more at least partial interruptions extend inclined in relation to an axial direction with respect to the working axis.

12. The tool as claimed in claim 1, wherein the frame is formed by multiple layers of the soft-magnetic and electrically conducting material, which are separated from one another by the one or more at least partial interruptions.

13. The tool as claimed in claim 12, wherein the layers of the soft-magnetic and electrically conducting material are stacked one on top of the other in a stacking direction, which is inclined in relation to the working axis.

14. The tool as claimed in claim 13, wherein the stacking direction is inclined at right angles in relation to the working axis.

15. The tool as claimed in claim 13, wherein the layers of the soft-magnetic and electrically conducting material are wound around a winding axis.

16. The tool as claimed in claim 13, wherein the layers of the soft-magnetic and electrically conducting material are substantially planar.

17. The tool as claimed in claim 12, wherein the layers of the soft-magnetic and electrically conducting material are wound around a winding axis.

18. The tool as claimed in claim 17, wherein the winding axis is oriented parallel to the working axis.

19. The tool as claimed in claim 12, wherein the layers of the soft-magnetic and electrically conducting material are substantially planar.

20. The tool as claimed in claim 1, comprising a hand-held tool.

* * * * *